United States Defensive Publication [19] (H) [11] T984,006

Clifford [43] Jul. 3, 1979

[54] COOLING TUBULAR EXTRUDATES

[75] Inventor: Michael L. Clifford, Welwyn, England

[73] Assignee: Imperial Chemical Industries Limited, London, England

[21] Appl. No.: 856,515

[22] Filed: Dec. 1, 1977

[30] Foreign Application Priority Data

Dec. 14, 1976 [GB] United Kingdom ..... 52078/76

[51] Int. Cl.[2] ..... B29C 25/00

[52] U.S. Cl. ..... 264/89; 264/95; 264/560

[57] ABSTRACT

An improved method of cooling an extruded tube of plastics material such as a substantially crystalline polymer of propylene, is disclosed in which the extruded tube is fed, in the direction of extrusion, in heat-transfer relationship with an adjacent cooling surface, such as an internal mandrel extending axially within the extruded tube, while maintaining this cooling surface at a temperature below the melting point of the plastics material. Interposed between and in contact with the tube and the cooling surface is a continuous sheath of a heat transfer liquid having a dynamic viscosity at 20° C. of from 2 to 20,000 centipoise. Preferably the heat transfer liquid has a boiling point below that of the die during extrusion of the tube. An aqueous dispersion or solution of a viscosity modifier, such as a cellulosic resin, is used and supplied to the sheath at a rate of from 0.02 to 0.5 liters/-minute/centimeter width of tube surface. The thus cooled tube is subsequently withdrawn from the cooling surface.

Further processing steps of reheating the cooled tube to its orienting temperature, transversely expanding the reheated tube by introducing a pressurizing gas into the tube and longitudinally extending the expanded tube to form a biaxially oriented tubular film may be used.

10 Claims, 1 Sheet Drawing,

17 Pages Specification

The file of this unexamined application may be inspected and copies thereof may be purchased (849 O.G. 1221, Apr. 9, 1968).

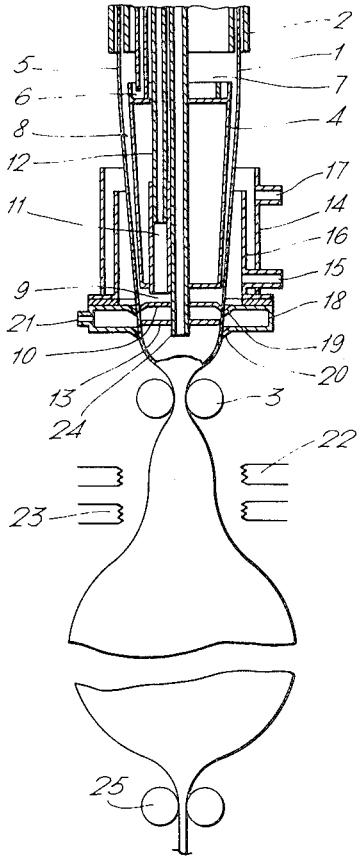

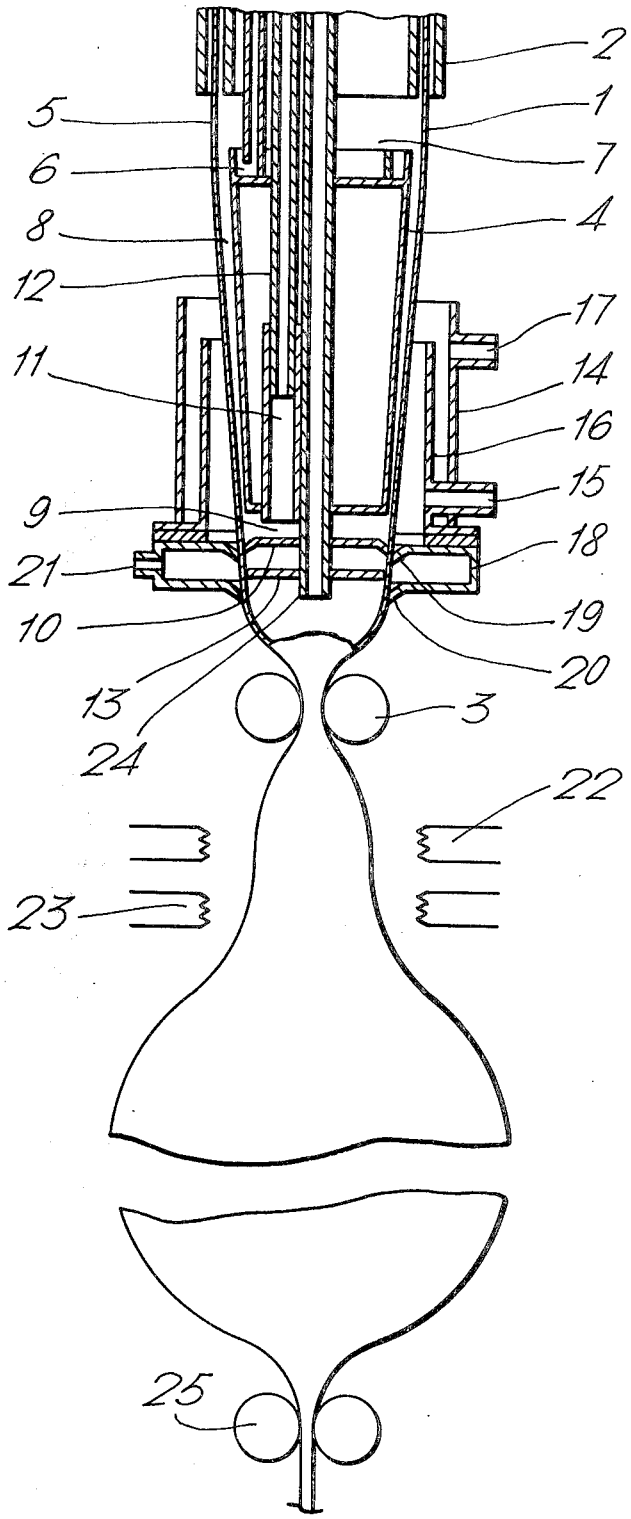
2
1
5
7
6
4
8
12
17
11
14
16
15
9
18
21
19
10
20
13
3
24
22
23
25